Patented July 4, 1933

1,917,181

UNITED STATES PATENT OFFICE

HUGO ACKERMANN, OF BONN-ON-THE-RHINE, GERMANY, ASSIGNOR TO DIDIER-WERKE AKTIENGESELLSCHAFT, OF BERLIN-WILMERSDORF, GERMANY

CERAMIC PRODUCTS AND METHOD OF MANUFACTURING THE SAME

No Drawing.   Application filed March 31, 1932.   Serial No. 602,389.

My invention relates to improvements in ceramic products and the method of manufacturing the same, and more particularly in the method by means of which refractory or acid-proof products are manufactured from leaning or non-plastic matter and a binding medium. The object of the improvements is to provide a method in which disintegrated leaning or non-plastic matter adapted to be bound by clay is mixed with finely ground raw flint-clay, water, and matter having a liquefying action on finely ground raw flint-clay into a plastic mass which cannot be cast, and in which the said plastic mass is moulded and burnt.

I may use any solid or non-plastic matter which is used in the ceramic art, such for example as fire-clay grog (chamotte), moderately burnt clay, used or spoilt refractory bricks, broken saggar, non-plastic shales or slates, quartz, quartzite, corundum, sillimanite, cyanite, andalusite, bauxite, minerals, diaspore, silicon carbide, magnesia, dolomite, chromium ore, zirconium, zirconia, rare earths, graphite, and also organic substances, which are burnt and provide pores when the product is burnt, such for example as sawdust, coal, coke, peat, etc., or mixtures of the said substances.

Substances which have a liquefying action on the finely ground raw flint-clay are especially caustic alkalies, soda, potash, waterglass, borax, any other compounds of the alkali metals having alkaline reaction or such compounds which produce, with water, compounds of alkaline reaction, further, any substances which are adapted to support liquefication of the flint-clay, such for example as humic acids, cellulose lye, etc., or mixtures of such substances. Further, the matter may contain protective colloids, such for example as mucinous substances, dextrin, and the like, which are adapted to maintain the flint-clay in liquid state.

In my improved method the flint-clay which acts as a binding medium is used in very fine distribution or in disperse-colloidal form. By the addition of matter having liquefying action, and, if desired, protective colloids to the finely ground flint-clay the binding power is considerably increased, and therefore the amount of the binding medium as compared to the leaning or non-plastic matter may be largely reduced. Simultaneously by the fine distribution an exceedingly uniform mixture and a particularly intimate binding with the leaning or non-plastic matter is obtained.

A particularly strong binding is obtained if also the basic matter, that is the leaning or non-plastic matter, consists of flint-clay of any form. For this purpose the flint-clay may be used in granular raw form. But it may also be dehydrated or partly dehydrated by burning. In one case it is heated only at a temperature at which a part of the chemically bound water is expelled which is ordinarily the case at a temperature of from 400 to 600° C. However, there are also sorts of flint-clay which are dehydrated at lower temperature. This moderate heating of the clay has the advantage that the major part of the chemically bound water is expelled, and that only so much fuel is needed as is required for this purpose. Thus the cost of the manufacture is less expensive than the ordinary burning of fire-clay grog.

The flint-clay which has thus been prepared has not entirely lost its water absorbing property, and therefore it is intimately bound to the binding media such for example as liquefied flint-clay.

If a material is to be worked which has very small shrinkage when it is afterwards burnt in a ceramic process, I use flint-clay which has been burnt so far that it does not shrink any more, that is flint-clay-grog. Also in this case the binding medium and the leaning matter have the same composition, so that an entirely homogeneous mass is produced.

A particularly uniform distribution of the binding medium in the mass is obtained by first transforming finely ground raw flint-clay, water, matter having liquefying action on the finely ground raw flint-clay and, if desired, the protective colloids into a slip, which is mixed with the leaning or non-plastic substances suitable for being bound by clay. Preferably the slip which may consist for example of raw flint-clay, water and liquefying substances is produced in such a way that water and the liquefying matter are added while grinding the flint-clay. Thereby the grinding is made more simple and speedy, and the cost is reduced, and further the flint-clay is more finely divided in the slip than by any other method.

I may also produce a very fluent slip by adding more water than is needed for moulding. After adding the leaning or non-plastic matter and mixing the components, the excess of water is removed by known methods, whereupon the matter is moulded and burnt in the usual way.

In other cases the basic material is mixed with the flint-clay, water, and the liquefying matter by first moistening the basic material with the water containing matter having liquefying action on raw flint-clay, and if desired, protective colloids, whereupon to the said water and other matter finely ground raw flint-clay is admixed. In a modification of the method the basic matter is first intimately mixed with the finely ground raw flint-clay and thereafter water is added which contains the liquefying medium and, if desired, protective colloids in a dissolved state. In both cases the components are mixed for a longer time into a mass which cannot be cast, whereupon the mass is moulded and burnt.

In all the methods referred to above the aforesaid leaning matter which is different in character from the flint-clay, or granular flint-clay, which is either in a raw state, or which has been burnt at comparatively low temperature or so far that it does not shrink any more are worked with the finely ground flint-clay acting as a binding medium.

Preferably all the components are mixed at such a ratio that sandy, crumbly masses are produced which can be moulded only by particularly heavy mechanical action, such for example as beating, stamping and pressing. The working of sandy or crumbly masses is advantageous for the reason that the amount of the finely ground liquefied flint-clay is comparatively small, so that comparatively little grinding is needed and a small amount of water is contained in the mass. Therefore little water must be vaporized when the mass is dried and burnt, and therefore the cost of burning is reduced. Further, the time needed for drying is small and shrinking is reduced to a minimum by my improved process, and particularly when leaning or non-plastic matter which does not shrink is used, moulded masses of high density and strength can be produced, which may be placed into the kiln without being preliminarily dried, or the said masses may be used without being burnt. In the last-named case the ceramic binding is effected when the furnace or fire-place made therefrom is put to use.

I claim:
1. The herein described method of manufacturing ceramically bound products, which consists in mixing disintegrated leaning or non-plastic matter adapted to be bound by clay with finely ground raw flint-clay, water, and matter having liquefying action on the flint-clay, moulding the uncastable composition thus obtained and burning the same.

2. The herein described method of manufacturing ceramically bound products, which consists in mixing disintegrated leaning or non-plastic matter adapted to be bound by clay with finely ground raw flint-clay, water, matter having liquefying action on the flint-clay, and a protective colloid, moulding the uncastable composition thus obtained and burning the same.

3. The herein described method of manufacturing ceramically bound products, which consists in mixing raw granular flint-clay with finely ground raw flint-clay, water, and matter having liquefying action on the finely ground raw flint-clay, and moulding and burning the uncastable composition thus obtained.

4. The herein described method of manufacturing ceramically bound products, which consists in mixing moderately burnt disintegrated flint-clay with finely ground raw flint-clay, water, and matter having liquefying action on the finely ground raw flint-clay, and moulding and burning the uncastable composition thus obtained.

5. The herein described method of manufacturing ceramically bound products, which consists in mixing granular flint-clay previously burnt so far that it does not shrink any more, with finely ground raw flint-clay, water, and matter having liquefying action on the finely ground raw flint-clay, and moulding and burning the uncastable composition thus obtained.

6. The herein described method of manufacturing ceramically bound products, which consists in mixing granular leaning or non-plastic matter adapted to be bound by clay with a slip of finely ground raw flint-clay, water, and matter having liquefying action on finely ground raw flint-clay, and moulding and burning the uncastable composition thus obtained.

7. The herein described method of manufacturing ceramically bound products, which consists in intimately grinding raw flint-clay, water, and matter having liquefying action on finely ground flint-clay into a slip, adding water to the said slip for rendering the same more fluent than necessary for moulding, adding to the said slip granular, leaning or non-plastic matter adapted to be bound by clay, mixing the composition thus obtained, removing the excess of water, and moulding and burning the same.

8. The herein described method of manufacturing ceramically bound products, which consists in moistening granular leaning or non-plastic matter adapted to be bound by clay with water having matter which has liquefying action on finely ground raw flint-clay dissolved therein, thereafter intimately mixing the mass thus obtained with finely ground raw flint-clay, and moulding and burning the uncastable composition thus obtained.

9. The herein described method of manufacturing ceramically bound products, which consists in mixing granular leaning or non-plastic matter adapted to be bound by clay with finely ground raw flint-clay, adding to the mixture a watery solution of matter having liquefying action on raw finely ground flint-clay, and moulding and burning the uncastable composition thus obtained.

10. The herein described method of manufacturing ceramically bound products, which consists in mixing disintegrated leaning or non-plastic matter adapted to be bound by clay with finely ground raw flint-clay, water, and matter having liquefying action on the said flint-clay into a lean crumbly mass, moulding the said mass by heavy mechanical action, and burning the same.

11. The herein described method of manufacturing ceramically bound products, which consists in mixing granular raw flint-clay with a slip obtained by intimately grinding raw flint-clay, water, and matter having liquefying action on raw finely ground flint-clay into a lean crumbly mass, moulding the said mass by heavy mechanical action, and burning the same.

12. The herein described method of manufacturing ceramically bound products, which consists in intimately grinding raw flint-clay, water, and matter having liquefying action on raw finely ground flint-clay into a slip, mixing the same with disintegrated moderately burnt flint-clay into a lean crumbly mass, moulding the said mass by heavy mechanical action, and burning the same.

13. The herein described method of manufacturing ceramically bound products, which consists in intimately grinding raw flint-clay, water, matter having liquefying action on raw finely ground flint-clay and a protective colloid into a slip, mixing the said slip with granular flint-clay burnt to a state free of shrinkage into a lean crumbly mass, moulding the said mass by heavy mechanical action, and burning the same.

14. The herein described method of manufacturing ceramically bound products, which consists in moistening granular raw flint-clay with water having matter having liquefying action on finely ground raw flint-clay dissolved therein, admixing to the composition thus obtained, so much finely ground flint-clay that a lean crumbly mass is obtained, moulding the said mass by heavy mechanical action, and burning the same.

15. The herein described method of manufacturing ceramically bound products, which consists in moistening granular flint-clay burnt to a state free of shrinkage with water having matter having liquefying action on finely ground flint-clay dissolved therein, admixing thereto so much finely ground raw flint-clay that a lean crumbly mass is produced, moulding the said mass by heavy mechanical action, and burning the same.

16. The herein described method of manufacturing ceramically bound products, which consists in mixing granular raw flint-clay with finely ground raw flint-clay, adding to the mixture a watery solution of matter having liquefying action on finely ground raw flint-clay, the components being at such a ratio that a sandy crumbly mass is obtained, moulding the said mass by heavy mechanical action, and burning the same.

17. The herein described method of manufacturing ceramically bound products, which consists in mixing disintegrated moderately burnt flint-clay with finely ground raw flint-clay, adding a watery solution of matter having liquefying action on finely ground raw flint-clay, the components being at such a ratio that a sandy crumbly mass is obtained, moulding the mass by heavy mechanical action, and burning the same.

18. The herein described method of manufacturing ceramically bound products, which consists in mixing granular flint-clay burnt to a state free of shrinkage with finely ground raw flint-clay, adding to the mixture a watery solution of matter having liquefying action on finely ground raw flint-clay, the components being at such a ratio that a sandy crumbly mass is obtained, moulding the mass by heavy mechanical action, and burning the same.

19. The herein described ceramic product, comprising a molded and burnt mixture of disintegrated leaning or non-plastic matter adapted to be bound by clay, finely ground raw flint-clay, water, and matter having liquefying action on flint-clay.

20. The herein described ceramic product, comprising a molded and burnt mixture of granular flint-clay and finely ground raw flint-clay, water, and matter having liquefying action on finely ground raw flint-clay.

In testimony whereof I have signed my name to this specification.

HUGO ACKERMANN.